Patented Feb. 12, 1929.

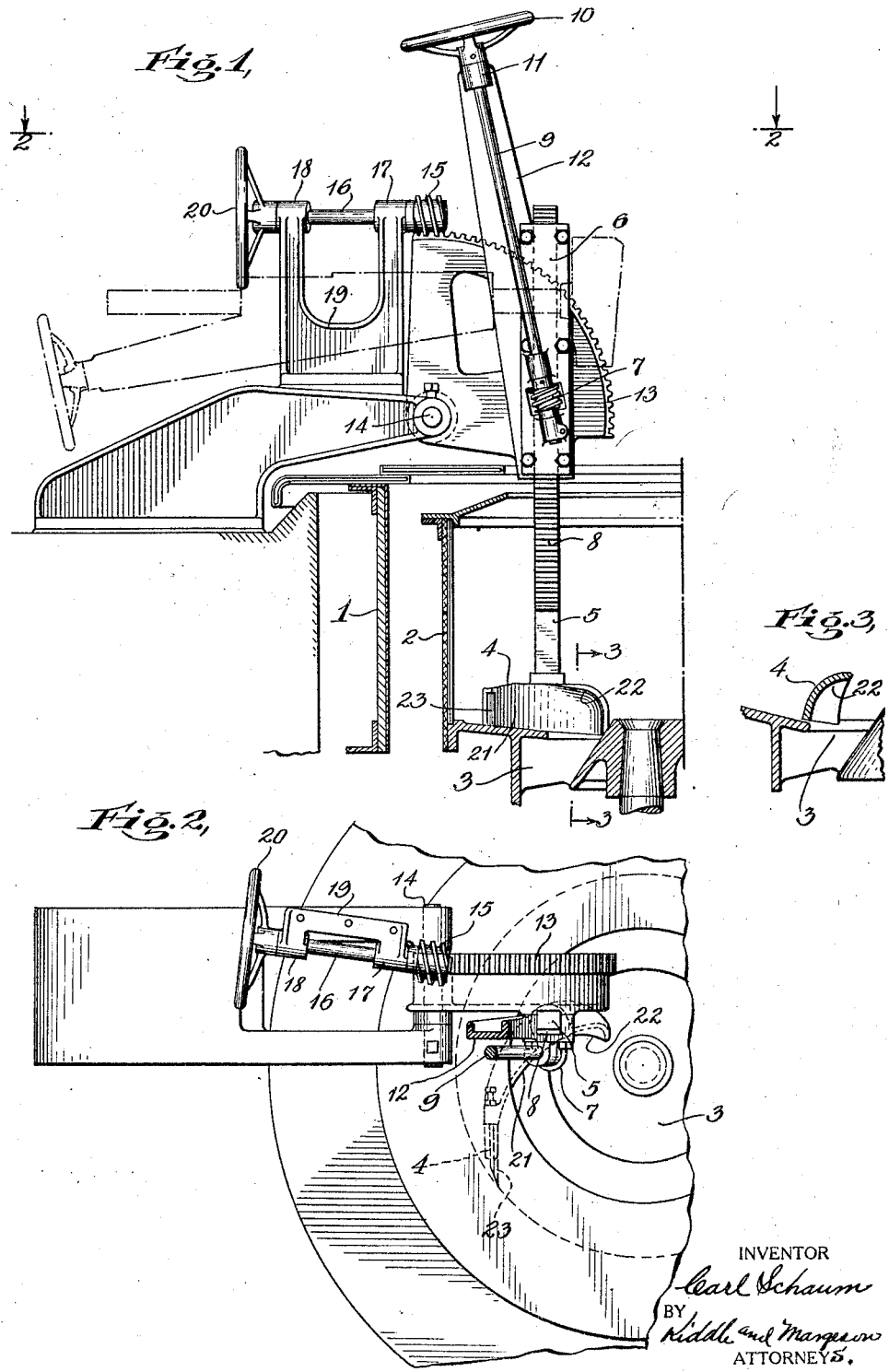

1,701,731

UNITED STATES PATENT OFFICE.

CARL SCHAUM, OF PHILADELPHIA, PENNSYLVANIA, ASSIGNOR TO FLETCHER WORKS, INCORPORATED, OF PHILADELPHIA, PENNSYLVANIA, A CORPORATION OF PENNSYLVANIA.

UNLOADER OR PLOW FOR CENTRIFUGALS.

Application filed July 31, 1926. Serial No. 126,299.

My invention relates to an improvement in plows or unloaders for centrifugal machines and has for one of its objects the provision of a device of this character so constructed as to insure the safety of the operator as well as of the machine.

In devices of this character as now constructed the plow is mounted for unrestrained manual manipulation, with the result that the services of a skilled operator are required in the unloading operation, and even then great care must be exercised in bringing the plow to operating or plowing position and in raising the plow, to prevent the plow tip from being pulled outwardly suddenly against the screen or basket due to the action of the material to be unloaded, and to prevent the operator from being thrown upon the machine.

According to my invention, I provide a plow or unloader which is under absolute control at all times and hence restrained positively from being thrown outwardly suddenly toward the basket or screen when moved into operating position.

A still further object of my invention is the provision of a centrifugal plow structure in which the action of the same is positive at all times and in which the plow itself is so shaped as to throw the unloaded material downwardly through the outlet in the bottom of the basket.

Further objects of the invention will appear hereinafter.

In the accompanying drawings, wherein I have illustrated an embodiment of my invention,—

Fig. 1 is a part sectional elevational view;

Fig. 2 is a section on the line 2—2 of Fig. 1; and

Fig. 3 is a section on the line 3—3 of Fig. 1.

Referring to the drawings in detail, 1 designates a centrifugal tub, which is stationary, and 2 the basket or screen which is rotatable, while 3 designates the outlet in the bottom of the basket. As this construction is well known in the art, I have deemed it unnecessary to illustrate the same in any detail.

4 designates the plow which is of improved construction, as will be pointed out in detail hereinafter.

The plow 4 is attached to the lower end of a vertically extending supporting and operating shaft 5 mounted for endwise movement in guideway 6. This movement of the shaft 5 and hence a corresponding movement of the plow 4 is positively effected through worm and rack connection 7 and 8 respectively, the worm 7 being mounted adjacent the lower end of an operating rod 9 controlled by a handwheel 10, the rod 9 being suitably mounted in bearings 11 carried by a supporting member 12. Manipulation of the handwheel 10 will, it is now apparent, effect a positive up and down movement of the plow so as to insure a travel of the plow across the inner face of the basket from top to bottom.

The shaft 5, its guideway 6, rod 9 and supporting member 12 are all mounted on or carried by a worm gear quadrant 13, pivoted for movement about a pivot 14. The quadrant is positively actuated by a worm 15 carried by a shaft 16, mounted in bearings 17 and 18 on fixed support 19. The shaft 16 is provided with a handwheel 20 by which it can be rotated.

In the unloading operation, it will be apparent from the foregoing, the plow 4 can be positively adjusted to desired positions both laterally and vertically as well as a combination of these two movements by operation of the handwheels 10 and 20, without danger of the plow tip as it engages the load being suddenly thrown outward. It will be seen also that the plow is positively held in all adjusted positions thereby insuring the safety of the machine and operator at all times.

As mentioned above the bottom of the basket is provided with an outlet 3, through which the material as it is unloaded by the plow is to be discharged. In order that the unloaded material may be thrown directly through this outlet, the plow, which is an irregular pipe like member, is curved inwardly as indicated at 21 toward the center of the basket to thereby overhang the opening 3, and downwardly, as indicated at 22, so that as the material is plowed from the side of the basket or screen by the tip 23 it will enter one end of the plow, follow along the inner face of the main portion thereof, and be delivered downwardly through the outlet 3.

It is to be understood that while I have described a specific embodiment of my invention, changes may be made in the details thereof and the arrangement of parts within the purview of my invention.

What I claim is:

1. The combination of a plow for centrifugals, and worm and gear mechanism for effecting positive controlled vertical and lateral movement of the plow.

2. The combination of a plow for centrifugals, a worm gear quadrant supporting said plow, and a worm for actuating said quadrant to effect a positive adjustment of the plow.

3. The combination of a plow for centrifugals, a gear quadrant supporting said plow, a gear for adjusting said quadrant, and a gear for adjusting the plow relatively to the quadrant.

4. The combination of a plow for centrifugals, a shaft carrying the plow, a gear for effecting vertical movement of the shaft and plow, a quadrant to which said shaft is operatively attached, and a gear for rocking said quadrant to effect lateral adjustment of said plow.

5. The combination of a plow for centrifugals and means for effecting a positive and continuous adjustment of the plow vertically and laterally, said means preventing the reaction of the plow forcing the plow to move in a direction opposed to its movement under the action of the said positive adjusting means.

6. The combination of a plow for centrifugals, and means for effecting a positive and continuous movement of the plow laterally and vertically simultaneously, said means preventing accidental reversal of the plow.

This specification signed this 13th day of July, 1926.

CARL SCHAUM.